R. STOCK, DEC'D.
H. MÜLLER, EXECUTOR.
SCRAPER FOR WHEELS.
APPLICATION FILED DEC. 29, 1911.
1,196,897.
Patented Sept. 5, 1916.
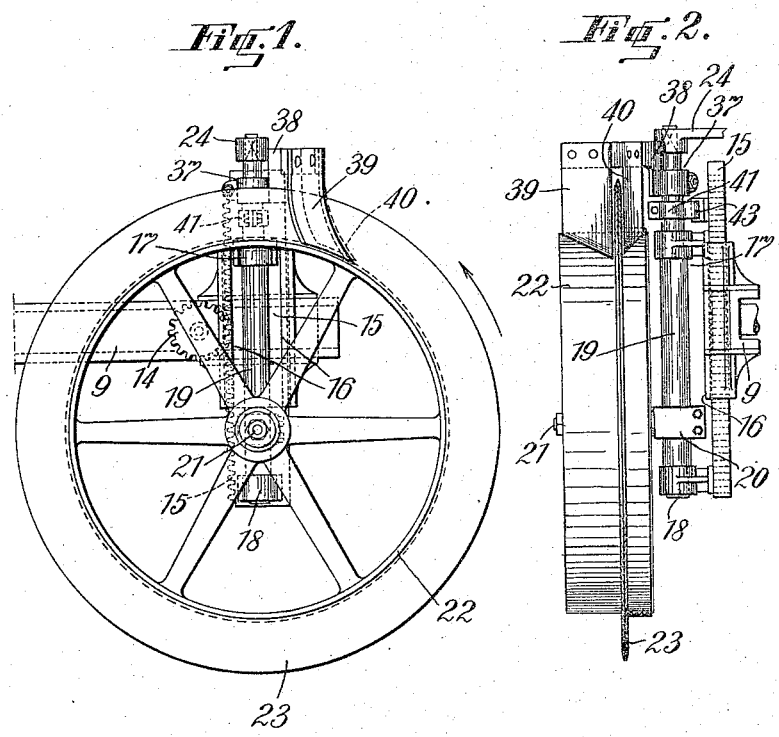
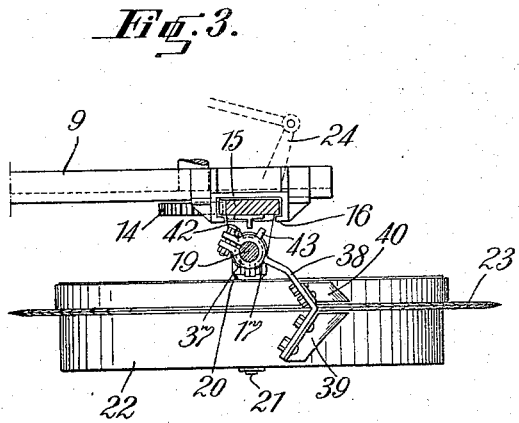
Witnesses:
Harriette C. Thirkield
Charles Mathie
Inventor
Robert Stock
by John Lotka
Attorney

UNITED STATES PATENT OFFICE.

ROBERT STOCK, OF BERLIN, GERMANY; HANS MÜLLER, EXECUTOR OF SAID STOCK, DECEASED, ASSIGNOR TO STOCK MOTORPFLUG GESELLSCHAFT MIT BESCHRANKTER HAFTUNG, OF BERLIN, GERMANY, A CORPORATION OF GERMANY.

SCRAPER FOR WHEELS.

1,196,897.                Specification of Letters Patent.        Patented Sept. 5, 1916.

Application filed December 29, 1911. Serial No. 668,450.

*To all whom it may concern:*

Be it known that I, ROBERT STOCK, a subject of the German Emperor, and resident of Berlin, Germany, have invented certain new and useful Improvements in Scrapers for Wheels, of which the following is a specification.

My invention relates to scrapers for wheels, and is particularly designed for application to a motor plow having a vertically adjustable steering wheel provided with a sharp peripheral flange adapted to engage the unplowed soil and to exert the lateral pressure required for a proper steering of the plow. In order that this flange may enter into the soil to the proper depth, the wheel is adjustable vertically.

In the practical use of plows provided with devices for adjusting such a steering wheel vertically, it has been found that when plowing in swampy, clayey or heavy ground, the soil will adhere more or less to the rim and to the sharp flange of the steering wheel, thereby reducing the depth to which such flange penetrates into the ground. This, by reducing the lateral pressure of the steering wheel upon the soil, is liable to seriously impair the steering of the plow, in some cases.

According to my present invention, the drawback pointed out above is overcome by providing, preferably in connection with the vertically movable carrier of the steering wheel, a scraper which fits (with some play) over the sharp flange of the steering wheel and automatically removes any lumps of soil which during the rotation of the wheel may adhere to its rim or its flange. Thus I insure an engagement of the sharp flange of the steering wheel with the soil, constantly to the proper depth for obtaining a good steering action. Preferably this scraper coöperating with the sharp flange of the steering wheel is bent at each side of the said flange, after the fashion of a plowshare, in the direction opposite to that in which the wheel rotates. By this arrangement the soil loosened from the rim and from the flange of the steering wheel will be pushed away laterally, thus avoiding the accumulation of soil particles on the scraper.

An example of a construction embodying my present invention is illustrated by the accompanying drawings, in which—

Figure 1 is a side elevation of the steering wheel and associated parts; Fig. 2 is a corresponding end view; and Fig. 3 a plan view, with parts in section.

In the particular form of my invention represented in the drawings, the steering wheel 22, provided with a sharp blade-like peripheral flange 23, is journaled upon an axle 21 rigidly connected with a clamp member 20. The latter is secured rigidly to a vertical shaft 19, the upper end of which is connected with the steering lever 24, connected in any well-known or approved manner with an actuating device (not shown), which the driver can operate from his seat. The shaft 19 is journaled in two bearings 17, 18 provided laterally on a vertical rack bar 15 movable in vertical guides 16 provided on the plow frame 9. A pinion 14 journaled in said frame and operated by means of a crank or other suitable mechanism (not shown) accessible from the driver's seat, meshes with the rack 15 and is thus adapted to raise or lower the rack and the steering wheel connected therewith, it being understood that the shaft 19 has no material endwise movement in the bearings 17, 18; for this purpose, the shaft portions within the bearings may be of reduced diameter, as shown. The rack 15 with the bearings 17, 18 forms a slide movable up and down on the plow frame 9. The rack 15 with its bearings 17, 18, shaft 19, clamp 20 and axle 21 together constitute an adjustable carrier for the wheel 22.

Now, according to my present invention, a clamp or collar 37 is secured rigidly to the upper portion of the shaft 19, and the angular side arm 38 projected from this collar carries a scraper consisting of two sheet metal sections 39, 40 located on opposite sides of the flange 23 so that the scraper fits (with some play) over said flange, the lower edges of the scraper members being close to the periphery of the steering wheel 22. In the construction illustrated, the scraper members are curved somewhat like plowshares, that is to say oppositely inclined in a transverse direction, as shown in Figs. 2 and 3, and also inclined circumferentially of the wheel (see Fig. 1), instead of being arranged radially. This peripheral inclination may be termed rearward, that is to say, it is in a direction contrary to the rotation of the wheel, such rotation being indicated by the arrow in Fig. 1. The points of the scraper members 39, 40 are adjacent to the flange 23 and in the rear of the other ends of said members, which other ends are adjacent to the edges of the wheel 22.

When the steering wheel 22 rotates in the direction indicated by the arrow, any soil particles adhering to the rim of the wheel or to the blade-like flange 23 are loosened by the scraper sections 39, 40 and deflected and thrown off laterally, owing to the above-described arrangement of said scraper sections. Thus the soil particles removed from the wheel rim and from the flange of the steering wheel cannot accumulate on the scraper and interfere with the proper operation of the steering device. The upper portion of the scraper 39, 40 is preferably vertical or approximately so, thereby preventing the soil particles scraped off the wheel, from falling back upon it. It will also be noticed that each section or member 39, 40 of the scraper has two operative edges, viz.: a side edge coöperating with the flange 23, and an end edge or bottom edge adjacent to the rim of the wheel 22 and coöperating therewith. The ends or points of the scraper sections are approximately tangential to the rim of the wheel 22, as shown in Fig. 1, thereby increasing their efficiency in removing soil from the rim.

If desired, the shaft 19 may carry, above the bearing 17, a collar 41 provided with stops 42, 43 adapted for coöperation with a stop 44 secured to the rack 15, to limit the rocking motion of the shaft 19 and therefore the horizontal swing of the steering wheel 22.

My improved scraper may be modified in various ways without departing from the nature of my invention as set forth in the appended claim.

I claim:

The combination, with a wheel having a cylindrical periphery or rim and a blade-like, plane flange projecting from the central portion of said periphery, of a scraper straddling said flange and having substantially parallel side edges located adjacent to said flange, and also having transverse inner edges adjacent to the rim of the wheel, said inner edges converging rearwardly, and the scraper being curved after the fashion of a plowshare.

In testimony whereof I have signed this specification in the presence of two subscribing witnesses.

ROBERT STOCK.

Witnesses:
HENRY HASPER,
WOLDEMAR HAUPT.

Copies of this patent may be obtained for five cents each, by addressing the "Commissioner of Patents, Washington, D. C."

It is hereby certified that the name of the assignee in Letters Patent No. 1,196,897, granted September 5, 1916, upon the application of Robert Stock, of Berlin, Germany, for an improvement in "Scrapers for Wheels," was erroneously written and printed, in that the word "Beschrankter" should be *Beschränkter*, with the umlaut over the letter "a;" and that the said Letters Patent should be read with this correction therein that the same may conform to the record of the case in the Patent Office.

Signed and sealed this 24th day of October, A. D., 1916.

[SEAL.]

F. W. H. CLAY,
*Acting Commissioner of Patents.*